UNITED STATES PATENT OFFICE.

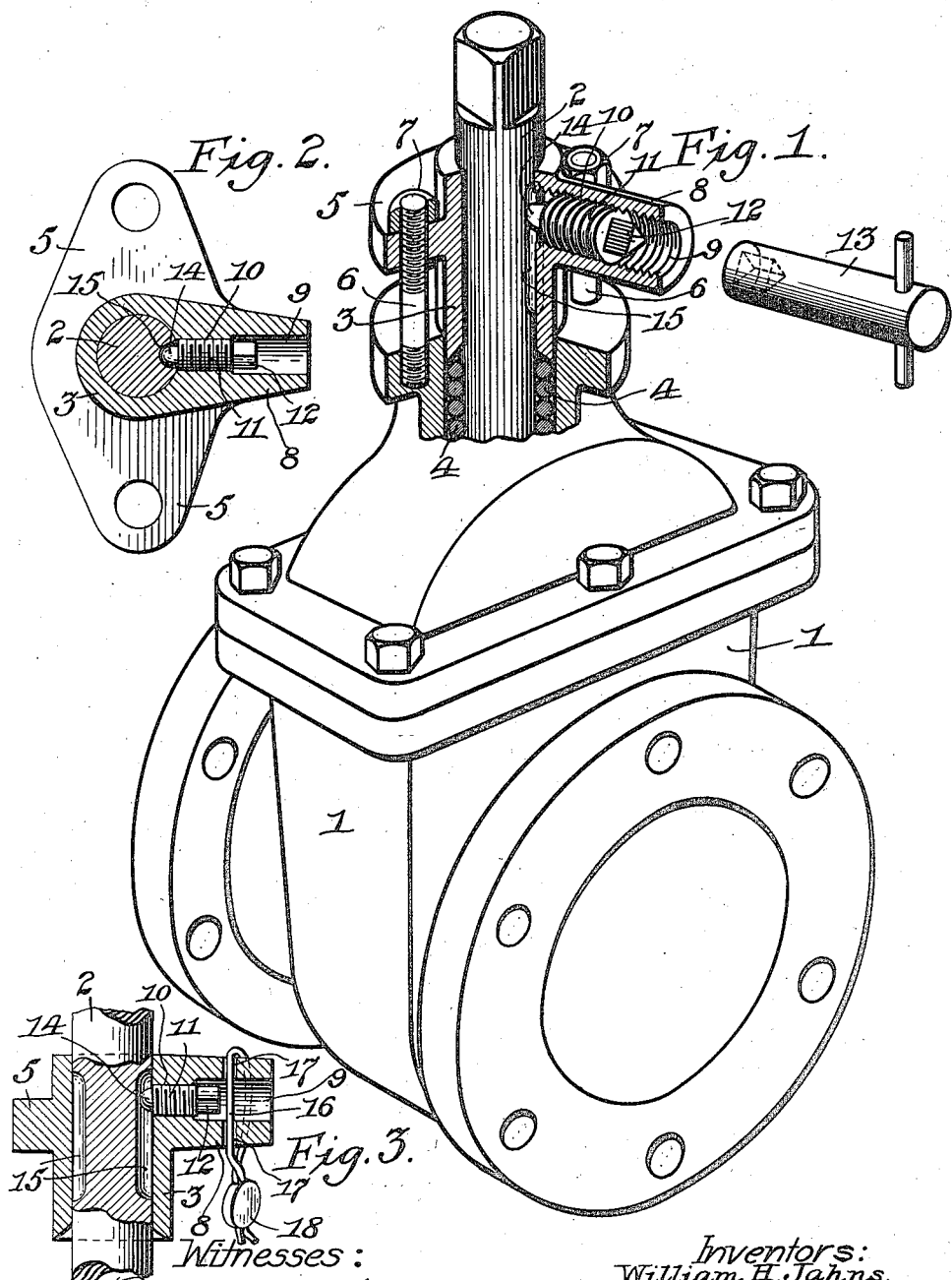

WILLIAM H. JAHNS, OSCAR A. KNOX, AND PHILIP A. WILCOX, OF LOS ANGELES, CALIFORNIA.

VALVE-LOCK.

1,231,164.  Specification of Letters Patent.  Patented June 26, 1917.

Application filed February 24, 1913. Serial No. 750,077.

*To all whom it may concern:*

Be it known that we, WILLIAM H. JAHNS, OSCAR A. KNOX, and PHILIP A. WILCOX, citizens of the United States, residing at Los Angeles, in the county of Los Angeles and State of California, have invented certain new and useful Improvements in Valve-Locks, of which the following is a specification.

This invention relates to improvements in valve locks, and particularly mechanisms for locking valves which are adjusted by means of a stem. While the lock may be applied to various types of valves, it may well be described as applied to the stem and packing gland of an irrigating valve for example, and is thus capable of preventing unauthorized operation of the valve as in obtaining water from an irrigating system at an improper or unwarranted time.

It is an object of the invention to provide a valve lock which is capable of engaging a recessed valve stem, whereby the stem can not be operated for opening or closing the valve.

It is a further object of the invention to provide a locking mechanism operating in conjunction with a packing gland, the said locking mechanism being adapted to prevent the operation of a valve stem, and yet permit of its packing gland being adjusted to prevent leakage while the valve is locked.

In the accompanying drawing, forming a part of this specification,

Figure 1 is a perspective view of a valve, showing the packing gland inclosing the stem thereof as broken away, and shown in section, the locking means engaging a recess in the valve stem.

Fig. 2 is a transverse sectional view through the valve stem and packing gland thereon, said section being taken longitudinally of the locking screw or bolt.

Fig. 3 is a detail, sectional view through a portion of the packing gland and the valve stem, showing the locking screw or bolt provided with a further locking mechanism which may be placed under seal.

In distributing materials through various pipe-line systems, and particularly in pipeline systems controlled by cut-off valves, it is found needful to be able to lock the valves of the system against unauthorized operation in order to prevent for example, parties from taking water from an irrigation system when it is not proper for them to do so, and also from taking too great a quantity of water. The locking means of the present invention is admirably adapted to accomplish the desired purpose, and is also so constructed that attendants whose duty it is to watch and guard against any leakage at the valves of the irrigating or other system may adjust the packing glands of the valves without having to unlock the valve stem holding means. The details and features of the invention will now be more particularly described, reference being had to the accompanying drawing.

1 indicates the casing of a usual or ordinary valve, 2 a valve stem which is adapted to operate the valve within said casing by means of its rotation. The valve stem is preferably partially inclosed by a packing gland having an adjustable gland member 3, which may be forced inwardly upon any suitable packing as 4. The gland member 3 is usually provided with a flange 5 engaging bolts 6 which are carried by the cap plate of the casing 1 and nuts 7 may be applied to the ends of said bolts to draw the gland member inwardly. The packing gland is provided with a lock carrying projection 8, preferably formed upon one side of the gland member 3. The projection 8 is usually formed integral with the flange 5 of the said gland member, so as to be braced and strengthened thereby. The projection 8 is bored longitudinally at 9 and provided with screw threads at 10 for receiving and adjustably holding a locking pin or bolt 11. The head of the pin 11 is formed with a many sided end portion 12, by which it may be turned through the agency of a key or handle 13. It is preferable to form the said head 12 with an odd number of faces so that ordinary wrenches in common use or pliers cannot be used for turning the same. Thus, only those who are furnished with a key made to fit the said head 12 can unlock the valve stem holding device. In use, a head having a triangular shape in cross section as shown in Fig. 1 is found to be the preferable form, since it is very difficult for an unauthorized person to fit an instrument thereto in attempting to unlock the device. By making the head 12 of only a slightly smaller diameter than the bore 9, there is very little room left between the edges of said head and the walls of the bore for the introduction of any unauthorized instrument. The key 13 is of course formed with a socket in its end, adapted to exactly fit the head 12 and the bore 9.

The inner end of the pin 11 is formed with a valve stem engaging point or end portion at 14. Said point may be of any desired shape, but is generally rounded and made approximately semi-spherical as shown in the drawings, and is adapted to fit in a groove or recess 15 formed in the valve stem 2. The said groove 15 extends longitudinally of the valve stem for a considerable distance, so that the packing gland member 3 may be adjusted for taking up any looseness in the packing 4, and preventing leakage about the valve stem without manipulating or disturbing the pin 11. By reference to the cross sectional view, Fig. 2, it will be seen that when the point 14 engages the said groove 15, that it is impossible to turn the valve stem 2, and thus open or close the valve. While one groove or recess 15 is generally preferred, the valve stem may be provided with a plurality of grooves as shown in Fig. 3. It will be evident that the recesses or grooves may be altered in shape and number, without departing in the least from the spirit and scope of the present invention.

In connection with the locking pin 11, further means of preventing unauthorized persons from tampering with the condition of the valve may be employed. Thus, as shown in Fig. 3, a wire 16 may be passed through apertures 17 formed in the hollow projection 8 of the device and the ends of the wire be brought together outside said projection 8 and secured by a seal 18, such for instance as are commonly employed in sealing doors of railway or other cars.

The operation of the device will be readily understood from the above description. The valve is adjusted to the position in which it is desired to maintain it, and the locking pin 11 is then turned inwardly so that its point 14 engages the recess 15. It can then only be removed and the valve stem turned by an authorized person having a key adapted to fit the head of the pin 11. The mechanism is especially useful in connection with plants like irrigation systems where water is distributed and delivered through piping controlled by valves of any desired type. It is found that persons will sometimes draw water from the system for use at unauthorized times, and also thus obtain more water than they should be allowed to take. The parties controlling the system will thus be able to prevent the opening of the valves for drawing water from the system except at such times as are proper and within their knowledge. The locking of the valve stem against turning, it will be noted, does not interfere with the tightening of the packing gland when leakage occurs at any of the valves. Thus, an attendant can be given the duty of watching the valves to prevent leakage at any of the packing glands, and yet be unauthorized to unlock and draw water through any of the said valves.

It will be understood that the locking mechanism can be adapted to various styles of valves, and that the locking pin may be made to engage any desired recesses or grooves or other roughened surfaces formed upon a valve stem, without departing from the spirit of the invention.

While the invention has been set forth above as very useful in connection with irrigating systems, it will be evident that it is also as well adapted for use in connection with other mechanisms and systems by which liquids, gases or other materials are to be controlled, distributed or delivered, and where valves are employed, which should be protected from unauthorized operation, all within the spirit and scope of the present invention.

What is claimed is:

1. A valve lock, comprising a gland member and a locking member adapted to engage the stem at different points along the length thereof according to the adjustment of the said gland, said locking means being adapted to prevent the turning of the valve stem for locking the valve.

2. A valve lock comprising a packing gland member capable of adjustment longitudinally of the valve stem for preventing leakage, and a locking pin carried by said gland member and adapted to be moved against the valve stem to prevent the turning of valve stem from any of the positions to which it may be moved for opening or closing the valve, the engagement of the pin with the valve stem not interfering with the adjustment of the packing gland member, whether the stem is locked or unlocked by said pin.

3. A valve lock comprising a packing gland member adapted to inclose a valve stem, a valve stem having an elongated longitudinally extending recess therein, a pin bolt adjustably mounted upon said gland member and adapted to hold the valve stem from turning in any of its adjusted positions, the said gland member having an inclosing projection extending beyond the end of said pin bolt, a locking member passing through said projection opposite the end of the pin bolt for preventing an unauthorized operation thereof and means for sealing the locking member.

4. A valve lock, comprising, in combination with a valve stem having an elongated groove formed therein, of an adjustable gland member carried by said valve stem and adapted to control packing surrounding said stem, an adjustable locking pin mounted upon said gland member, and having a projecting point adapted to engage the groove of said valve stem for holding the valve closed or in adjusted open positions and means for adjustably holding the gland member in place upon a valve casing, the adjustment of said gland member not affecting the position of the locking pin.

In testimony whereof, we have hereunto set our hands, in presence of two witnesses.

WILLIAM H. JAHNS.
OSCAR A. KNOX.
PHILIP A. WILCOX.

Witnesses:
CASSELL SEVERANCE,
EDNA B. ROLLINS.